United States Patent Office 3,798,255
Patented Mar. 19, 1974

3,798,255
ETHERS OF POLYCHLORINATED BENZONITRILES
Lewis William Watts, Jr., Austin, Tex., assignor to Jefferson Chemical Company, Inc., Houston, Tex.
No Drawing. Filed May 3, 1971, Ser. No. 139,868
Int. Cl. C07c 121/52
U.S. Cl. 260—465 F                    1 Claim

ABSTRACT OF THE DISCLOSURE

Novel ethers are prepared via the interaction of pentachlorobenzonitrile with alkali metal salts of saturated aliphatic alcohols such as methanol, ethanol, propanol, t-butanol and aromatic alcohols such as phenol or substituted phenols. These new compounds have biological activity and are also useful as chemical intermediates.

BACKGROUND OF THE INVENTION

Field of the invention

The invention pertains to new compositions of matter, their synthesis and their biological use.

Description of prior art

Beck, G., Degener, E., and Heitzer, H., Liebigs Ann. Chem., 716, 47 (1968) discuss the chemistry of pentachlorobenzonitrile. Of special interest in this paper are the observations recorded concerning the di-alkylation of pentachlorobenzonitrile with amines. Such reactions were observed to:

(a) Proceed only under rather drastic conditions;
(b) Give rise to the desired products in only moderate yields;
(c) Often be accompanied by partial dechlorination.

It was quite surprising to discover that one, two, or three of the chlorine groups in pentachlorobenzonitrile could be replaced with one, two, or three alcoholate or phenolate functions with almost 100% selectively and conversion by simply employing one, two, or three moles, respectively, of an alkali metal alcoholate or phenolate with each mole of pentachlorobenzonitrile. The observed high degree of selectivity is especially surprising in view of the unexpected high reactivity of pentachlorobenzonitrile with alkali metal alcoholates and phenolates. Also, the facile conversion of lower, i.e., less than tri-ethers, to higher, i.e., up to an including tri-ethers, upon treatment with the alkali metal salts was not expected.

SUMMARY OF THE INVENTION

New compounds of the formula

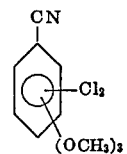

wherein A is alkyl of 1 to 8 carbon atoms or aryl, $x$ is 2, 3, or 4 and $y$ is 1, 2 or 3 are useful biological chemicals. The compounds are prepared by the interaction of pentachlorobenzonitrile with alkali metal salts of alcohols or phenols wherein the alcoholates or phenolates are derived from saturated aliphatic alcoohls such as methanol, ethanol, propanol or t-butanol or aromatic alcohols such as phenol or substituted phenols.

DESCRIPTION OF THE PREFERRED EMBODIMENTS

The new ethers of my invention are prepared by the interaction of pentachlorobenzonitrile and an alkali metal salt of an alcohol or a phenol. The alkali metal alcoholates or phenolates are derived from saturated aliphatic alcohols such as methanol, ethanol, propanol, or t-butanol or aromatic alcohols such as phenol or substituted phenols by any of the methods known to those skilled in the art, e.g., from the alcohol and alkali metal, the alkali metal hydride, or the alkali metal hydroxide. The preformation of the alkali metal alcoholate or phenolate is probably not necessary for the successful completion of the reactions described below. Amines such as pyridine which function as catalysts may be used in the synthesis of the compounds of my invention. The following examples illustrate individual preparations of compounds of my invention but are not to be construed as limitative.

EXAMPLE 1

Preparation of trimethoxy-dichlorobenzonitrile

Into a 2-liter glass flask was placed 66.0 grams (0.24 mole) pentachlorobenzonitrile and 1.5 liters pyridine. After cooling this solution to 5° C., 218 gms. (0.99 mole) of a 25% sodium methoxide in methanol solution was added via a dropping funnel at a rate such that the temperature of the reactants did not exceed 25° C. Following completion of the addition, the temperature was increased to 50° C. and stirring continued for 30 minutes. When cool, the crude reaction mixture was treated with a large volume of cold water, then filtered. The almost white trimethoxy-dichlorobenzonitrile of the formula

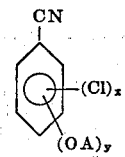

weighed 47.9 gms.; analysis of this material by gas liquid chromatography (GLC) indicated the purity to be 100%, i.e., only one compound was present. Recrystallization from petroleum ether gave long white needles, M.P. 132.5–133.5.

The nuclear magnetic resonance (NMR) spectrum consisted of two sharp singlets at 4.1 (6H) and 4.0 p.p.m. (3H) while the infrared (IR) spectrum showed a characteristic nitrile absorption at 2222 cm$^{-1}$ and an ether band at 1099 cm$^{-1}$. Further characterization of the reaction product was provided by mass spectral analysis; calculated mass number for trimethoxy-dichlorobenzonitrile, 261. Observed parent molecular ion, 261 m/e.

EXAMPLE 2

Synthesis of trimethoxy-dichlorobenzonitrile

To a solution of 3.7 gms. (0.014 mole) methoxytetrachlorobenzonitrile in 200 ml. of pyridine was added in one portion 7.0 gms. (0.033 mole) of a 25% sodium methoxide in methanol solution. After warming at 50° C. for 15 minutes the reaction mixture was treated with a large quantity of cold water, then filtered. The infrared spectrum of the dry product (light tan solid, 3.5 gms., 97.8% yield) was identical with the spectrum of trimethoxy-dichlorobenzonitrile prepared in Example 1, above.

EXAMPLE 3

Synthesis of methoxy-tetrachlorobenzonitrile

To a cold (4° C.) solution of 66.0 gms. (0.24 mole) pentachlorobenzonitrile in 1200 ml. pyridine was added dropwise with stirring 57.0 gms. (0.26 mole) of a 25% sodium methoxide-methanol solution. After addition of the sodium methoxide had been completed, the reaction temperature was increased to 35° C. and maintained at that temperature for 30 minutes. The cool reaction mixture was poured into a large excess of water, filtered, and the filtrate discarded. The solid was dissolved in chloroform, treated with MgSO₄, filtered, then placed under reduced pressure until free of solvent. The weight of the white, rather fluffy solid was 59.2 gms., which corresponds to a 92.1% yield of methoxy-tetrachlorobenzonitrile, a compound of the formula.

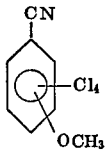

M.P. 136–145° C.

GLC analysis of the crude product indicated the presence of two components in a ratio of approximately 1:2. Preparative scale gas-liquid chromatography in conjunction with NMR, infrared, and mass spectral data readily allowed for identification of both components; both are monosubstitution products, namely methoxy-tetrachlorobenzonitrile.

EXAMPLE 4

Preparation of methoxy-tetrachlorobenzonitrile

A mixture of 11.0 gms. (0.04 mole) pentachlorobenzonitrile in 200 ml. dioxane was placed in a 500 ml. glass reaction vessel. A solution of 25% sodium methoxide in methanol (9.5 gms., 0.042 mole) was quickly added in one portion with vigorous stirring of the reaction mixture. After the orange colored mixture had been heated at 55° C. for 30 minutes, it was poured into water, then filtered. In this manner there was isolated 10.7 gms. (98.8% yield) of pale yellow methoxy-tetrachlorobenzonitrile.

EXAMPLE 5

Preparation of dimethoxy-trichlorobenzonitrile

A solution of 114.0 gms. (0.528 mole) of a 25% sodium methoxide-methanol in 100 ml. absolute methanol was added dropwise to a stirred solution of 66.0 gms. (0.25 mole) pentachlorobenzonitrile in 1500 cc. of pyridine. The rate of the sodium methoxide addition was adjusted so that the original temperature of the solution (20° C.) was maintained until the addition had been completted. Thereafter, the reaction mixture was stirred at 35° C. for 60 minutes. Using the same product recovery technique as described for the isolation of the monomethoxy derivative in Example 3, 55.8 gms. of a white crystalline solid was obtained; the yield of dimethoxy-trichlorobenzonitrile of the formula

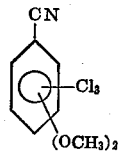

was 94.5%. Crystallization from carbon tetrachloride gave fine needles, M.P. 105.5–107° C.

*Analysis.*—Calculated for C₉H₆Cl₃NO₂: 39.91% chlorine, 5.26% nitrogen. Found: 39.9% chlorine, 5.18% nitrogen.

Calculated mass number, 265.

Observed parent molecular ion, 265 m./e.

Infrared spectrum: 2242 cm.-1, nitrile; 1101 cm.-1, ether.

EXAMPLE 6

Preparation of t-butoxy-tetrachlorobenzonitrile

To a solution of 27.5 gms. (0.1 mole) pentachlorobenzonitrile in 200 ml. tetrahydrofuran was added 11.2 gms. (0.1 mole) potassium t-butoxide. After stirring the resulting mixture at 25° C. for 1 hr., it was allowed to stand overnight. Following the addition of ice cold water, the mixture was extracted two times with ether. The combined ether extracts were dried over MgSO₄, filtered, then evaporated under reduced pressure. Both the NMR and infrared spectrum of this material were consistent with the proposed formula, viz,

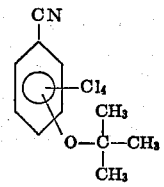

EXAMPLE 7

Preparation of ethoxy-tetrachlorobenzonitrile

A solution of sodium ethoxide in ethanol, prepared by adding 4.6 g. sodium to 150 ml. absolute ethanol, was quickly added to a mixture consisting of 55.0 g. pentachlorobenzonitrile and 260 ml. pyridine. To avoid reaction temperatures in excess of 75° C., ice water cooling was required.

Following the usual procedure, there was isolated a colorless crystalline material (54.9 g.) which was shown to be ethoxy-tetrachlorobenzonitrile of the formula

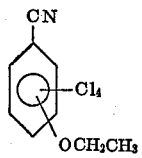

colorless needles from heptane-ether, M.P. 81–91° C.

*Analysis.*—Calculated for C₉H₅Cl₄NO (284.96); 37.94% C, 1.77% H, 49.77% Cl, 4.92% N, 5.62% O. Found: 37.44% C, 1.54% H, 5.14% N.

EXAMPLE 8

Preparation of phenoxy-tetrachlorobenzonitrile

A mixture of 6.8 gms. KOH, 9.8 gms. phenol, and 300 ml. toluene was heated until 150 ml. of toluene had distilled. To the resulting mixture was added 250 ml. pyridine followed by 27.0 gms. pentachlorobenzonitrile. After heating at 50° C. for two hours, the crude reaction product was poured into water. Filtration of the resulting mixture provided 28.0 gms. phenoxy-tetrachlorobenzonitrile of the formula

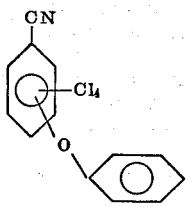

Crystallization from heptane-toluene gave small colorless plates, M.P. 196–199° C.

*Analysis.*—Calculated for C₁₃H₅Cl₄NO (333.00); 46.89% C, 1.51% H, 42.59% Cl, 4.21% N, 4.80% O. Found: 47.00% C, 1.46% H, 42.57% Cl, 4.03% N.

Both the NMR and IR were consistent with the proposed formulation.

Comparable results are obtained in preparing other ethers within the scope of my invention.

The compounds of my invention are useful biological chemicals, particularly in controlling undesirable vegetation, which is illustrated by the data in the tables, below. The data in Table I show monomethoxy-tetrachlorobenzonitrile and dimethoxy-trichlorobenzonitrile to be post emergent herbicides against morning glory (of the bindweed family) while non-phytotoxic to corn. The data in Table 2 show monomethoxy-tetrachlorobenzonitrile to be a pre-emergent herbicide against pigweed and setaria while non-phytotoxic to corn and dimethoxy-trichlorobenzinitrile to be a pre-emergent herbicide against pigweed and Johnson grass while non-phytotoxic to corn and tomato. The data in Table 3 show monomethoxy-tetrachlorobenzonitrile, dimethoxy-trichlorobenzonitrile and trimethoxy-dichlorobenzonitrile to exert fungicidal activity against early blight on tomatoes and to be non-phytotoxic to tomato plants. The data in Table 4 show trimethoxy-dichlorobenzonitrile to be an active fungicide against sclerotium-cuks. Comparable results to those in the tables, below, are obtained in testing other ethers within the scope of my invention.

POST EMERGENCE HERBICIDAL SCREEN TEST

The purpose of this test recorded in Table 1 was to make foliar application to a series of crops, under standard conditions, to evaluate the post-emergence herbicidal activity of the compounds of the invention. The crops employed in this post-emergence herbicidal evaluation were pigweed, setaria, morning glory, tomatoes, Johnson grass, oats, wheat, milo, red kidney beans and corn. Weed species were approximately 2" in height at time of spraying, corn about 4" and wheat and oats 3". Tomatoes and red kidney beans were approximately three weeks old. The compounds were extended in water to obtain the desired final suspension. The compounds were screened at 5 pounds per acre (active ingredient) calculated on a broadcast basis. Effective amounts range from 1 to 15 pounds per acre. The plants were scored for phytotoxicity 10 to 12 days after spray application. Phytotoxicity ratings are based upon a scale of 0 to 10 in which 0 indicates no injury to the other extreme where 10 indicates that the plants were killed.

PRE-EMERGENCE HERBICIDAL EVALUATION

The purpose of this test recorded in Table 2 was to determine herbicidal activity of compounds of the invention by a soil pre-emergence evaluation on seven crops. Flats were planted to the desired crops to a depth of approximately one-half inch. The crops employed were pigweed, tomato, morning glory, Johnson grass, milo, setaria and corn. Care was employed in using a consistent amount of soil in the bottom of the flats, in the use of a templet in the marking of the seed rows, in the amount of seeds used, and particularly in the amount of soil placed on top of the seeds, in the interest of uniformity from day to day and test to test. The compounds were initially screened at a dosage of 10 pounds of active ingredient per acre. Effective amounts range from 3 to 15 pounds per acre. The compounds were extended in water and 250 ml. of such a suspension uniformly distributed over each flat. The flats were immediately transferred to the greenhouse and covered for a period of three days so that additional watering was not required until some of the plants had begun to make their appearance above ground.

When it was assured that all emergence had occurred, as determined by the check, emergence counts were made on all crops. At the end of 14 to 16 days, a phytotoxicity reading was made on the various crops indicating the extent of damage not only by the stand of the crops, but also the extent of damage to the emerged seedlings. Phytotoxicity data are recorded on a scale of 0 to 10 in which 0 indicated no injury to the other extreme where 10 indicates that the plants were killed.

TABLE 2.—PRE-EMERGENCE HERBICIDAL EVALUATION

| Compound | Variable | Pig weed | Setaria | Johnson grass | Milo | Morning glory | Tomato | Corn |
|---|---|---|---|---|---|---|---|---|
| Monomethoxytetrachlorobenzonitrile | Percent emergence | 10 | 30 | 85 | 85 | 85 | 10 | 5 |
|  | Rating | 10 | 7 | 2I | 0 | 0 | 10 | 08 |
| Dimethoxytrichlorobenzonitrile | Percent emergence | 50 | 50 | 20 | 60 | 85 | 85 | 5 |
|  | Rating | 5 | 6I | 8 | 4I | 0 | 0 | 80 |

I=Inhibited.

FOLIAR FUNGICIDE SCREENING USING EARLY BLIGHT ON TOMATOES

The objective of this test was to evaluate the compounds of the invention as foliar fungicide protectants using early blight (*Alternaria solani*) on tomatoes. The compounds were applied to tomato foilage (variety Bonnie Best) at a dosage of 500 parts per million (p.p.m.) while the plants were being rotated on a turn-table. Effective amounts range from 100 to 500 p.p.m. The spray deposit was allowed to thoroughly dry on the foilage and then sprayed with a spore suspension of *Alternaria solani* again while the plants were being rotated on a turn-table. Immediately after inoculation the plants were transferred to a constant temperature-humidity cabinet for a period of 24 hours. At the end of this time the plants were moved to the greenhouse bench. Final data was recorded five to six days after incubation at which time the untreated check controls were showing some 150 to 250 early blight lesions per three sets of three terminal leaflets per plant. Percent control was recorded as the percentage of lesions occurring on the treated plants over the number of lesions occurring on the untreated controls.

TABLE 1.—POST EMERGENCE HERBICIDAL EVALUATION—PHYTOTOXICITY RATINGS

| Compound | Pig weed | Setaria | Johnson grass | Milo | Morning glory | Tomato | Oats | Wheat | Red kidney beans | Corn |
|---|---|---|---|---|---|---|---|---|---|---|
| Monomethoxy-tetrachlorobenzonitrile | 0 | 0 | 0 | 1I | 9 | 8M | 0 | 0 | 0 | 0 |
| Dimethoxytrichlorobenzonitrile | 0 | 0 | 0 | 0 | 10 | 3 | 0 | 0 | 0 | 0 |

NOTE.—I=Inhibited. M=Morphegenic.

TABLE 3.—EVALUATION AS FOLIAR PROTECTANT FUNGICIDES USING EARLY BLIGHT AS THE TEST ORGANISM

| Compound | P.p.m. | Percent early blight control | Phytotoxicity rating |
|---|---|---|---|
| Monomethoxy-tetrachlorobenzonitrile | 500 | 50 | 0 |
| Dimethoxy-trichlorobenzonitrile | 500 | 25 | 0 |
| Trimethoxy-dichlorobenzonitrile | 500 | 30 | 0 |

SOIL FUNGICIDE SCREENING AGAINST RHIZOCTONIA, FUSARIUM, PYTHIUM AND SCLEROTIUM

The purpose of the test was to evaluate soil fungicidal activity of trimethoxy-dichlorobenzonitrile by means of discrete Soil-Borne Fungi. The test organisms were raised in sterile soil cultures to which had been added 20% by weight of corn meal. The soil to be used for dilution purposes was separately sterilized by means of methyl bromide. The pure culture soil to be used for test purposes was then prepared by admixing 10% by weight of the test organism inoculum with 90% by weight of sterilized soil.

The test soil was then aliquoted in 50-gram quantities to 3 replicated paper cups. Such soil was then treated with the chemical by drenching each cup with 10 ml. of the trimethoxy-dichlorobenzonitrile. The chemical concentration was so adjusted that the 10 ml. quantity gave a dosage of 100 p.p.m. based on the weight of the soil (BW/S). The cups or trays were then held in a constant temperature-humidity cabinet for the duration of the test. In the absence of control, masses of white mycelium (MYC) developed on the surface of the test vessels and control was readily evident visually. It is easy to recognize degrees of control based upon the extent of mycelial growth and a rating scale of 10 to 0 is used, in which 10 indicates no mycelial growth to the other extreme where 0 indicates that no control is present.

I claim:
1. A process for preparing compounds of the formula

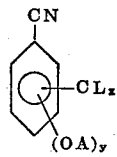

wherein A is alkyl of 1 to 8 carbon atoms or phenyl, $x$ is 2, 3 or 4, and, correspondingly, $y$ is 1, 2, or 3 the sum of $x$ and $y$ being 5, which comprises mixing and reacting pentachlorobenzonitrile with an alkali metal salt of an alcohol of 1 to 8 carbon atoms per molecule or phenol at a temperature of from about 4° C. to about 75° C.

TABLE 4.—SOIL FUNGICIDAL EVALUATION OF CANDIDATE MATERIALS

| Compound | BW/S, p.p.m. | Pythium-peas | | Rhizoctonia-beets | | Sclerotium-cuks | | Fusarium-tomato | |
|---|---|---|---|---|---|---|---|---|---|
| | | MYC growth | Percent stand | MYC growth | Percent stand | MYC growth | Percent stand | MYC growth | Percent stand |
| Trimethoxy-dichlorobenzonitrile | 100 | 0 | 0 | 0 | 20 | 5 | 85 | 0 | 75 |

References Cited

UNITED STATES PATENTS 3,535,365  10/1970  Weinstock et al. ___ 260—465 F
3,585,233   6/1971  Heywood _____ 260—465 F
3,475,480  10/1969  Habibi _____ 260—465 F

FOREIGN PATENTS 1,912,600   9/1969  Germany _____ 260—465 F

OTHER REFERENCES

Vasilevskaya et al., J. Org. Chem. U.S.S.R. 6, pp. 125–130 (1970).

C. A., vol. 68, 1968, section 59336 (I.C.D. Ltd.).

RODD Chemistry of Carbon Compounds, vol. 3–A (aromatic compounds), 1954, pp. 114–115.

JOSEPH P. BRUST, Primary Examiner

U.S. Cl. X.R.

71—105; 424—304

UNITED STATES PATENT OFFICE
CERTIFICATE OF CORRECTION

Patent No. 3,798,255　　　　　　　　　　Dated March 19, 1974

Lewis William Watts, Jr.
Assignor to Jefferson Chemical Company, Inc.
Houston, Texas, a corporation of Delaware It is certified that errors appear in the above-identified patent and that said Letters Patent are hereby corrected as shown below:

In column 1, line 48, "an" should read -- and --; column 1, line 65, "alcoohls" should read -- alcohols --.
In column 3, line 47, "completted" should read -- completed --.
In columns 5 and 6, Table 2, last column,

| "Corn | should read -- | Corn |
|---|---|---|
| 5 | | 85 |
| 08 | | 0 |
| 5 | | 85 |
| 80" | | 0 --. |

Signed and sealed this 17th day of September 1974.

(SEAL)
Attest:

McCOY M. GIBSON JR.　　　　　　　　　　C. MARSHALL DANN
Attesting Officer　　　　　　　　　　　　Commissioner of Patents